3,056,715
NITROSO DYE IN ASBESTOS BEATER SATURATION

David A. Feigley, Jr., and Leonard N. Ray, Jr., both of Manor Township, Lancaster County, Pa., assignors to Armstrong Cork Company, Lancaster, Pa., a corporation of Pennsylvania
No Drawing. Filed Apr. 15, 1958, Ser. No. 728,547
11 Claims. (Cl. 162—155)

This invention relates generally to fibrous products and more particularly to water-laid products of chrysotile asbestos fibers. Still more particularly the invention relates to the deposition of the rubber content of a synthetic rubber latex upon chrysotile asbestos fibers while in suspension in water, and thereafter forming the resulting slurry of coated fibers into products such as sheets and the like.

Prior processes for the deposition of the rubber content of synthetic rubber latices onto asbestos fibers in water are generally too expensive. The best of these prior processes is fully described in U.S. Patent 2,759,813, Feigley, issued August 21, 1956; this is the so-called citrate process.

It is the primary object of the present invention to present a product and process wherein asbestos fibers are treated to impart color to the fibers and at the same time render those fibers susceptible to deposition thereon of the rubber content of a synthetic rubber latex. It is a further object of the present invention to present a simple, economical, easily controlled process for the production of pleasantly colored products from rubber-coated asbestos fibers.

The invention contemplates forming a slurry of chrysotile asbestos fibers in water. To this slurry there is added a water-soluble nitroso dye having the formula:

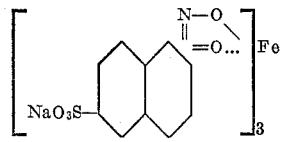

The water-soluble nitroso dye reacts with the surfaces of the chrysotile asbestos fibers, thus coloring those surfaces and rendering them chemically receptive to deposition thereon of a rubber binder. A synthetic rubber latex is then added to the dye-treated slurry. Simple agitation then brings about deposition of the rubber content of the synthetic rubber latex onto the dye-treated chrysotile asbestos fibers. The resulting slurry of evenly coated chrysotile asbestos fibers is then formed into a product such as a sheet.

A simple flow diagram of the process follows:

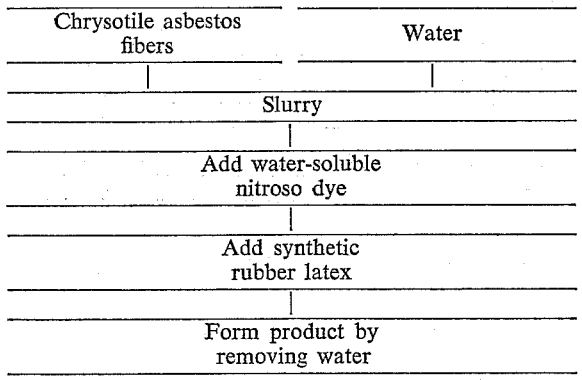

The slurry of chrysotile asbestos fibers may be formed in known manner. The fibers are added to sufficient water in a chest or other convenient container in an amount such that the resulting slurry contains about 0.3–5% by weight fibers. The preferred consistency of the slurry initially is about 5% by dry weight asbestos based on the total weight of the slurry. The slurry will be subjected to mechanical refining as in a beater, Jordan engine, disc refiner, or the like to produce a slurry wherein the fibers have been reduced to the desired degree of length and diameter. Refining will generally be equivalent to that produced in about 5–15 minutes in a Valley laboratory beater with standard weights. After refining the slurry will generally be diluted with water to a consistency of about 1%.

The slurry is then ready for the addition of the above-described dye. Preferably the dye will be added to the slurry in the form of a water solution; such addition expedites the reaction which takes place between the dye and the entire surface of the asbestos fibers. The amount of dye to be used will generally be in the range of 0.1–1.5% by weight dye based on the dry weight of the asbestos fibers. Within this range the preferred amount will generally be 0.3–0.6% by weight dye based on the dry weight of the asbestos. The reaction between the dye and the fibers generally takes place within ten minutes and more usually within five minutes. The end point of the reaction between the dye and the fibers is readily determined by noting that the dye is no longer present in the water phase of the slurry. However, slight excess of dye in the water does not adversely affect the process.

The reaction of the dye with the asbestos fibers does not produce any noticeable change in the asbestos slurry. The Canadian 3-gram freeness of the 1% consistency asbestos slurry runs about 50 prior to the addition of the dye and it remains at 50 after the dye has reacted with the asbestos. Chemically, however, the individual asbestos fibers have been greatly modified. If a synthetic rubber latex were to be added to the slurry prior to the dye addition, the rubber simply forms balls and agglomerates, and the entire slurry is useless. However, when the rubber latex is added subsequent to the reaction of the proper amount of dye with the asbestos fibers, the rubber content of the synthetic rubber latex smoothly and evenly deposits onto the dye-reacted fibers with no outside aid save agitation. Thus it can be seen that the dye used in the present invention acts as a chemical modifier toward the asbestos fibers in such a manner as to allow the rubber to deposit onto the fibers. The mechanism of the reaction between the dye and the chrysotile asbestos fibers is not understood. In any case once the dye has reacted with the asbestos fibers the slurry is then ready for the addition of the synthetic rubber latex.

The latex to be added may be any of a number of synthetic rubbers used in the practice of conventional beater saturation methods. Typical of these synthetic rubbers are the products known as GR–S (SBR) which are copolymers of butadiene and styrene containing about 50% to about 70% by weight butadiene. There may also be used the rubbers designated as Buna N or Hycar (NBR); these are copolymers of butadiene and acrylonitrile containing about 50% to about 80% by weight butadiene. The neoprenes (CR) may also be used. The neoprenes are polymers of 2-chloro-butadiene-1,3, which polymers are also known as polychloroprene. There may be employed the homopolymers of butadiene (BR) as well as homopolymers and/or copolymers of butadiene homologues such as the isoprene rubbers (IR). These are the materials which are generally designated as synthetic rubbers herein. They may be more specifically designated as rubber-like polymers of butadiene, isoprene, and chloroprene, and rubber-like copolymers of butadiene or isoprene with copolymerizable vinyl compounds such as styrene and acrylonitrile. These synthetic rubbers are added to the slurry in the form of their latices. The latices normally contain about 25% to about 50% by weight rubber solid. The latices contain additional compounding ingredients such as stabilizers and the like which are well-known to the art and which form no part of the present invention.

The synthetic rubber latex is added as such to the dye-treated slurry of asbestos fibers. The entire mass is agitated whereby it will be found that the rubber content of the synthetic rubber latex will deposit evenly and smoothly onto the dye-reacted chrysotile asbestos fibers. The resulting slurry of rubber-coated fibers is then formed into a product such as a sheet either on conventional papermaking equipment such as a Fourdrinier wire or cylinder machine, or in shaped molds which allow the draining of the water while retaining the rubber-coated fibers.

The amount of rubber to be deposited on the fibers may be selected in accordance with the requirements of the final product. Generally speaking the amount of rubber deposited on the fibers will be in the range of about 10%–75% by weight rubber based on the dry weight of the fibers. Where the final product is to be a sheet from which gaskets are to be cut, the amount of rubber in the sheet will be adjusted in accordance with the requirements of the particular use for the particular gasket. Most frequently it will be found that about 20%–30% by weight rubber based on the dry weight of the asbestos fibers yields good all-around sheet goods which lend themselves to gasketing applications and to use of the product as a backing for floor covering material such as plastic flooring sheets and tiles.

The following examples illustrate several embodiments of the invention. All parts are by weight unless otherwise stated.

*Example I*

To a refined slurry containing 37.5 parts chrysotile asbestos fibers in 3,750 parts water was added 0.15 part of a rubber antioxidant, polymerized 1,2-dihydro-2,2,4-trimethylol quinoline (Flectol H) followed by 0.5 part of a dye having the structural formula:

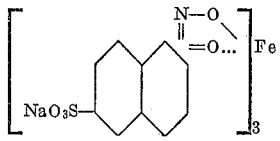

After agitation there was added 18.8 parts of a 40% solids butadiene-styrene copolymer latex (GR-S 2000) and gentle agitation was maintained in the mixture. The rubber had completely precipitated onto the fibers in 14 minutes yielding a rubber-coated asbestos slurry having a Canadian freeness of 760. A sheet formed in the 12″ x 12″ mold yielded excellent gasketing material.

*Example II*

Example I was repeated save that there was used 18 parts of a 51% solids polychloroprene latex (neoprene 750). An excellent sheet resulted.

*Example III*

Example I was repeated save that there was used 18 parts of a 41% solids butadiene-acrylonitrile copolymer latex (Hycar 1561).

An excellent strong rubber-bonded asbestos sheet resulted.

We claim:
1. A method of making a beater-saturated asbestos product comprising forming a slurry of chrysotile asbestos fibers in water, adding to said slurry a water-soluble nitroso dye having the formula:

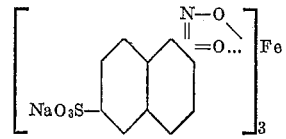

which dye reacts with the surfaces of said chrysotile asbestos fibers, adding a synthetic rubber latex to the resulting slurry while agitating said slurry whereby the rubber content of said latex is evenly deposited on said chrysotile fibers, and forming the resulting slurry of coated fibers into a product by removing the water therefrom.

2. A method according to claim 1 wherein said synthetic rubber comprises a butadiene-styrene copolymer.

3. A method according to claim 1 wherein said rubber comprises a butadiene-acrylonitrile copolymer.

4. A method according to claim 1 wherein said rubber comprises a polychloroprene.

5. The method according to claim 1 wherein said dye is used in an amount of about 0.1%–1.5% by weight based on the dry weight of said fibers.

6. A water-laid product comprising chrysotile fibers whose surfaces are reacted with a water-soluble dye having the formula:

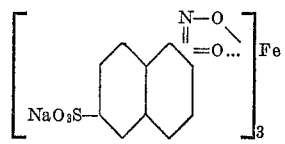

said dye-reacted fibers having deposited thereon an outer coating of a synthetic rubber.

7. A product according to claim 6 wherein said synthetic rubber comprises a butadiene-styrene copolymer.

8. A product according to claim 6 wherein said synthetic rubber comprises a butadiene-acrylonitrile copolymer.

9. A product according to claim 6 wherein said synthetic rubber comprises a polychloroprene.

10. A product according to claim 6 wherein said synthetic rubber is present in an amount of about 10%–75% by weight based on the dry weight of said fibers.

11. A product according to claim 6 wherein said dye is present in an amount of about 0.1%–1.5% by weight based on the dry weight of said fibers.

References Cited in the file of this patent

UNITED STATES PATENTS

| | | |
|---|---|---|
| 1,956,053 | Tucker | Apr. 24, 1934 |
| 2,149,979 | Pace | Mar. 7, 1939 |
| 2,485,458 | Quinn | Oct. 18, 1949 |
| 2,626,213 | Novak | Jan. 20, 1953 |
| 2,661,288 | Barbaras | Dec. 1, 1953 |
| 2,666,699 | McQuiston | Jan. 19, 1954 |
| 2,698,788 | Greenman | Jan. 4, 1955 |
| 2,730,446 | Hutchins | Jan. 10, 1956 |
| 2,759,813 | Feigley | Aug. 21, 1956 |
| 2,769,713 | Wilson | Nov. 6, 1956 |
| 2,797,163 | Smith | June 25, 1957 |
| 2,807,543 | McQuiston | Sept. 24, 1957 |
| 2,930,106 | Wrotnowski | Mar. 29, 1960 |